United States Patent
Li et al.

(10) Patent No.: US 9,002,155 B2
(45) Date of Patent: Apr. 7, 2015

(54) INTEGRATED OPTICAL-ELECTRONIC INTERFACE IN PROGRAMMABLE INTEGRATED CIRCUIT DEVICE

(75) Inventors: Peng Li, Palo Alto, CA (US); Sergey Shumarayev, Los Altos Hills, CA (US); Jon M. Long, Livermore, CA (US); Tien Duc Pham, San Jose, CA (US)

(73) Assignee: Altera Corporation, San Jose, CA (US)

( * ) Notice: Subject to any disclaimer, the term of this patent is extended or adjusted under 35 U.S.C. 154(b) by 549 days.

(21) Appl. No.: 13/360,314

(22) Filed: Jan. 27, 2012

(65) Prior Publication Data

US 2012/0251116 A1    Oct. 4, 2012

Related U.S. Application Data

(60) Provisional application No. 61/468,471, filed on Mar. 28, 2011.

(51) Int. Cl.
    *G02B 6/42*    (2006.01)
    *G02B 6/43*    (2006.01)
    *G02B 6/12*    (2006.01)
    *H04J 14/02*   (2006.01)
    *H04B 10/40*   (2013.01)

(52) U.S. Cl.
    CPC .............. *H04J 14/02* (2013.01); *G02B 6/4249* (2013.01); *G02B 6/43* (2013.01); *G02B 6/4292* (2013.01); *G02B 6/12* (2013.01); *G02B 6/4257* (2013.01); *H04B 10/40* (2013.01)

(58) Field of Classification Search
    None
    See application file for complete search history.

(56) References Cited

U.S. PATENT DOCUMENTS

| | | | |
|---|---|---|---|
| 5,631,988 A * | 5/1997 | Swirhun et al. | 385/89 |
| 6,821,029 B1 | 11/2004 | Grung et al. | |
| 6,945,712 B1 * | 9/2005 | Conn | 385/94 |
| 7,215,891 B1 | 5/2007 | Chiang et al. | |
| 7,729,581 B2 * | 6/2010 | Rolston et al. | 385/52 |
| 2003/0010988 A1 | 1/2003 | Franson | |
| 2003/0072537 A1 | 4/2003 | Eichenberger et al. | |
| 2003/0201462 A1* | 10/2003 | Pommer et al. | 257/200 |
| 2005/0084269 A1* | 4/2005 | Dallesasse et al. | 398/135 |
| 2005/0232635 A1 | 10/2005 | Aronson et al. | |
| 2005/0286902 A1* | 12/2005 | Pierce et al. | 398/139 |
| 2006/0088254 A1* | 4/2006 | Mohammed | 385/92 |

(Continued)

FOREIGN PATENT DOCUMENTS

| | | |
|---|---|---|
| CN | 101103560 | 9/2008 |
| JP | 2008-523581 | 7/2008 |
| WO | WO03/032021 | 4/2003 |
| WO | WO2005/093973 | 10/2005 |

OTHER PUBLICATIONS

"The 50G Silicon Photonics Link," Intel Labs, White Paper, Jul. 2010, pp. 1-5.

(Continued)

*Primary Examiner* — Michelle R Connelly
(74) *Attorney, Agent, or Firm* — Ropes & Gray LLP

(57) ABSTRACT

Systems that provide integrated circuit device circuitry having an integrated optical-electronic interface for high-speed off-device communications are provided. An optical-electronic interface may be incorporated into an integrated circuit device, freeing up some or all of the electrical I/O pins of the integrated circuit device. Transceiver I/O channels may be provided on an integrated circuit device that can be switched between electrical and optical transceiver I/O channels.

15 Claims, 6 Drawing Sheets

(56) References Cited

U.S. PATENT DOCUMENTS

| | | |
|---|---|---|
| 2006/0120660 A1 | 6/2006 | Rolston et al. |
| 2007/0258683 A1 | 11/2007 | Rolston et al. |
| 2008/0226228 A1* | 9/2008 | Tamura et al. .................. 385/33 |
| 2010/0054754 A1 | 3/2010 | Miller et al. |
| 2011/0216998 A1* | 9/2011 | Symington et al. ............. 385/14 |
| 2011/0249936 A1* | 10/2011 | Welch et al. .................... 385/31 |
| 2014/0144971 A1* | 5/2014 | Conn et al. .................... 228/102 |

OTHER PUBLICATIONS

"*Reflex Light on Board®*—Xilinx Virtex V Optically Enabled FPGA (OE-FPGA)," presentation given by Reflex Photonics Inc., The *Light on Board®* Company, Document # LA-970-056-00 Rev. 1, Nov. 2008, 13 slides.

* cited by examiner

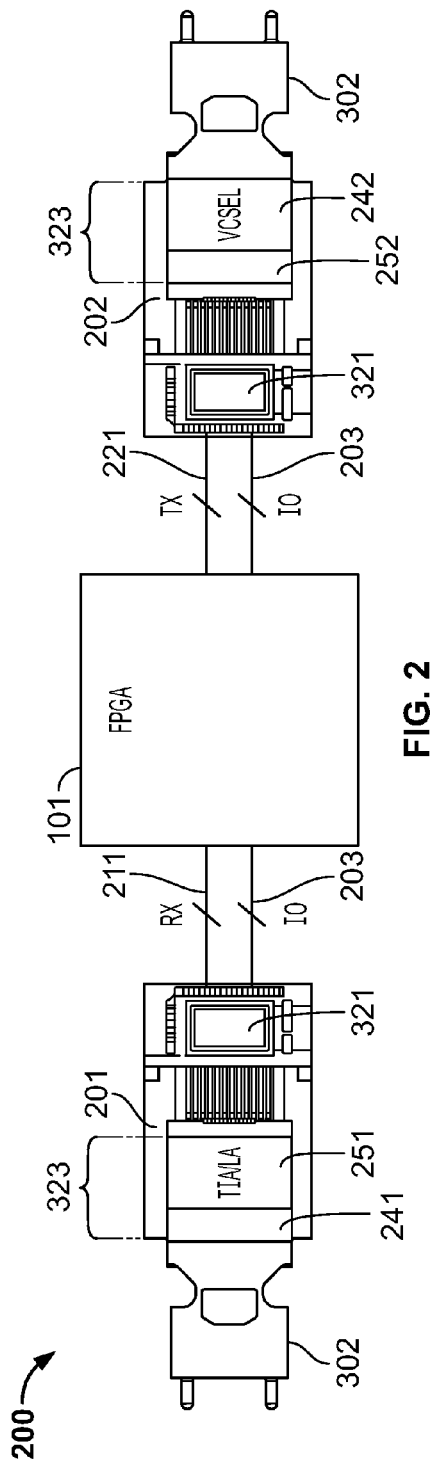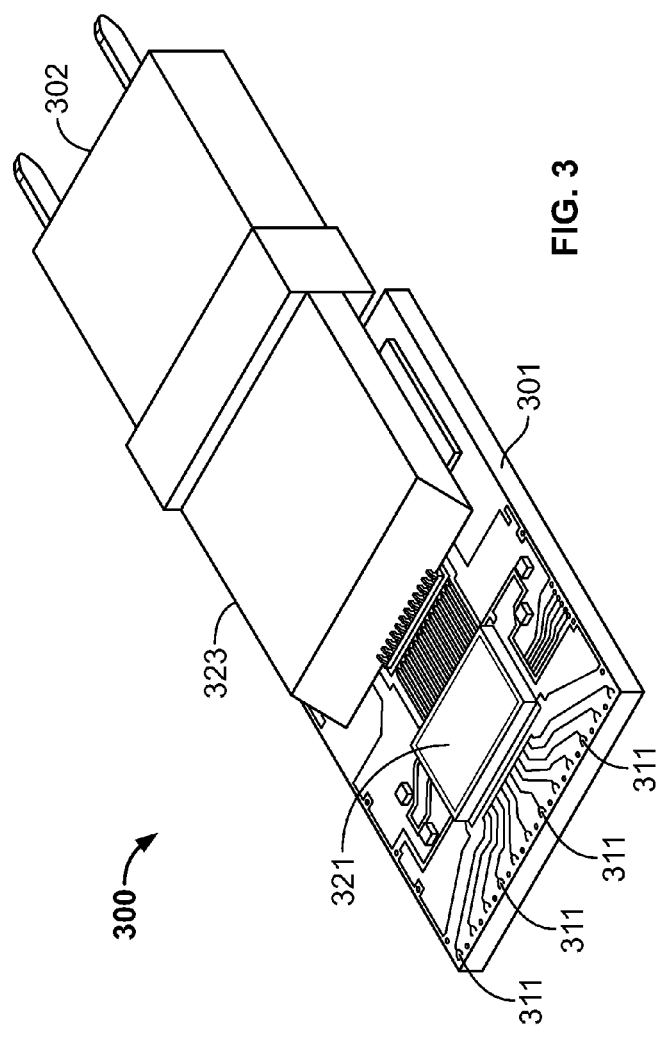

INTEGRATED OPTICAL-ELECTRONIC INTERFACE IN PROGRAMMABLE INTEGRATED CIRCUIT DEVICE

CROSS REFERENCE TO RELATED APPLICATION

This claims the benefit of, commonly-assigned U.S. Provisional Patent Application No. 61/468,471, filed Mar. 28, 2011, which is hereby incorporated by reference herein in its entirety.

FIELD OF THE INVENTION

This invention relates to a programmable integrated circuit device, and particularly to a programmable integrated circuit device having an integrated optical-electronic interface for high-speed off-device communications.

BACKGROUND OF THE INVENTION

As data-intensive electronic devices and applications proliferate, data rates continue to increase. In many applications, integrated circuit devices are able to function at sufficiently high data rates, but copper wire used to connect such devices to each other or to system backplanes has become a bottleneck to those data rates. For example, devices may be capable of operating internally at rates at or exceeding 10 Gbps, but external bottlenecks are caused by signal frequency-dependent loss and reflections at the backplane level, which may cause severe inter-symbol interference (ISI).

Optical signaling is one alternative that supports higher data rates because the loss of optical fiber may be "virtually" zero compared with copper. However, conversion from on-device electrical or electronic signaling to off-device optical signaling presents its own challenges. This is particularly the case where the integrated circuit device is programmable, such as, e.g., a field-programmable gate array (FPGA) or other programmable logic device (PLD). This is because the very nature of a PLD is to provide flexibility to the user (i.e., to the manufacturer of a product who incorporates PLDs into the product). Therefore, the particular type of optical-electronic interface needed will not be known by the PLD manufacturer, nor will the location on the PLD of the particular input/output (I/O) circuits to which an optical-electronic interface will need to be connected be known to the PLD manufacturer.

SUMMARY OF THE INVENTION

One solution is to provide a plurality of different optical-electronic interfaces on a printed circuit board (PCB) on which the PLD also is mounted, along with an assortment of optical-electronic connectors. Thus, a single such PCB may include one or more of each of the following types of optical-electronic interfaces and connectors:

1. XFP (10 Gigabit Small Form Factor Pluggable Module), which is a hot-swappable, protocol-independent optical transceiver for 10 Gbps applications.
2. CFP (C (100 in Latin) Form-Factor Pluggable Module) for 100 Gbps applications.
3. SFP (Small Form-Factor Pluggable Module), also known as Mini-GBIC, which is a compact, hot-swappable transceiver for 4.25 Gbps applications. SFP+ may operate up to 10 Gbps.
4. QSFP (Quad SFP), which replaces four single-channel SFPs in a package about 30% larger than a single-channel SFP, for 10 Gbps applications, with an effective throughput of 40 Gbps.

This makes for a bulky PCB, and also introduces additional wire paths from the PLD I/O ports to all of the various interface modules on the PCB.

According to another solution, one or more discrete optical-electronic interface components may be incorporated into the same package as the PLD die for use with one or more of the high-speed serial interfaces of the PLD. However, one disadvantage of such a solution is that while optical transceiver I/O channels are provided at the package level, electrical I/O pins are consumed at the die level to provide control signals to the optical-electronic interface components, reducing the number of I/O pins that can be provided for users at the package level—e.g., for clocks and controls.

Various embodiments of the present invention incorporate an optical-electronic interface into a PLD, freeing up all of the electrical I/O pins. In further embodiments, rather than having to commit a particular transceiver I/O to being either optical or electrical, switchable electrical/optical transceiver I/O channels can be provided.

According to an embodiment, electronic portions of each optical-electronic interface—i.e., portions of one optical-electronic receiver interface and of one optical-electronic transmitter interface—may be incorporated into the PLD die, leaving only the optical portions as discrete components. The optical portions may be surface-mounted on the die, or connected by wires to the die and packaged in the same package as the die.

According to an embodiment, some of the optical portion of the transmitter and receiver interface—specifically, the laser driver (LD) on the transmitting side, and the transimpedance amplifier/limiting amplifier/automatic gain control (TIA/LA/AGC) on receiving side, which actually are electronic—may be incorporated into the PLD die along with the other electronic portions, leaving only the photodiode of the optical-electronic receiver interface and the laser and optical portion of the optical-electronic transmitter interface as discrete components. Once again, the optical portions may be surface-mounted on the die, or connected by wires to the die and packaged in the same package as the die.

According to an embodiment, all of the optical portions of both the receiver optical-electronic interface and the transmitter optical-electronic interface may be incorporated into the PLD die along with the electronic portions, leaving only the optical fiber connectors external to the die (and the package).

In any of the foregoing embodiments, it may be desirable to provide to the user the option of using one or more high-speed serial interface channels in either optical or electrical or electronic mode. Therefore, each of the foregoing embodiments may have one of the following three variants:

In a variant, optical-electronic interfaces would be provided for all of the high-speed serial interface channels and the user would not be given any option for a high-speed serial electrical or electronic interface. A user who wanted electrical or electronic interface capability would have to choose a different model of PLD.

In a variant, a mix of optical and electrical or electronic high-speed serial interface channels would be provided, by providing optical-electronic interfaces for only some of the high-speed serial interface channels on the PLD. If this variant were adopted, different models of the same PLD might be provided with different proportions of electrical or electronic and optical channels.

In a variant, optical-electronic interfaces would be provided for all of the high-speed serial interface channels, but the user would be able to programmably select between optical and electrical or electronic operation for some or all of the high-speed serial interface channels. For example, a programmable interconnect component, such as a multiplexer, could be provided in some or all of the high-speed serial interface channels to allow the channel to be programmably connected either to a conventional electrical or electronic I/O pin, or to an optical-electronic interface.

BRIEF DESCRIPTION OF THE DRAWINGS

Further features of the invention, its nature and various advantages will be apparent upon consideration of the following detailed description, taken in conjunction with the accompanying drawings, in which like reference characters refer to like parts throughout, and in which:

FIG. 2 is a schematic representation of a system for providing an optical-electronic interface for high-speed serial I/O channels on a programmable logic device;

FIG. 3 is a perspective view of an example of an optical-electronic interface module used in the system of FIG. 2;

DETAILED DESCRIPTION OF THE INVENTION

Figure 1:
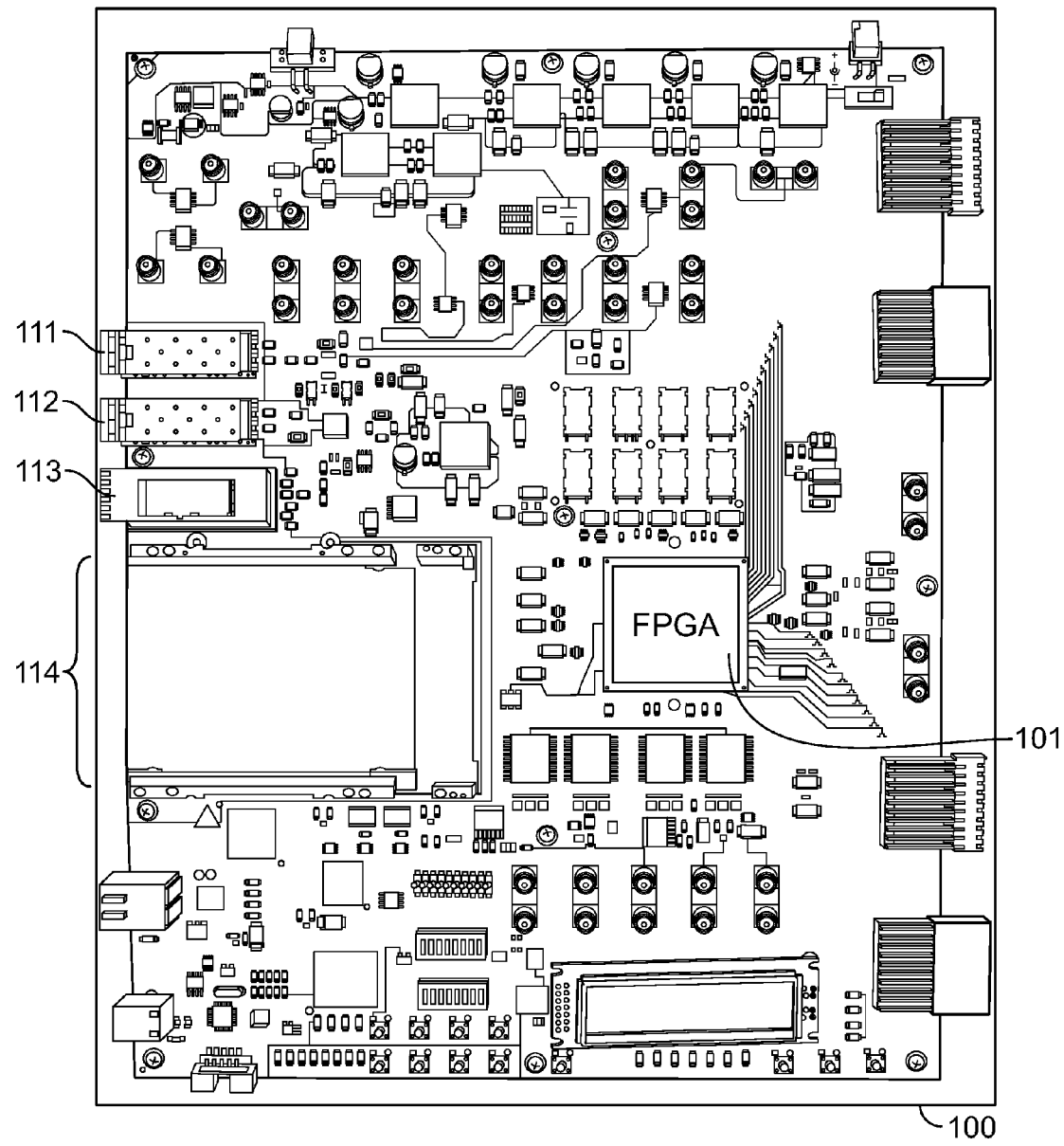
FIG. 1 shows a system for providing an optical-electronic interface for high-speed serial I/O channels on a programmable logic device.

As seen in FIG. 1, a system, described briefly above, for providing an optical-electronic interface for high-speed serial I/O channels of a PLD, is a printed circuit board 100 on which is mounted a PLD such as FPGA 101, which may be STRATIX® IV GX/GT® or STRATIX® V GX/GT® FPGA, available from Altera Corporation, of San Jose, Calif., which includes a plurality of high-speed serial I/O channels as well as a programmable logic core and conventional I/O ports. Different ones of the high-speed serial I/O channels are connected to various different optical-electronic interfaces also mounted on PCB 100, including SFP+ 111, SFP 112, QSFP 113 and CFP+ 114, which can operate at data rates of up to 10 Gbps, 4.25 Gbps, 40 Gbps, and 100 Gbps, respectively. This system is bulky, and may subject the high-speed I/O signals to delay, skew and other timing issues resulting from the lengths of the board traces between FPGA 101 and interfaces 111-114.

In system 200 shown schematically, and not to scale, in FIG. 2, FPGA 101 may be connected to optical-electronic interface modules 201 and 202, which also may be referred to as optical subassemblies (OSAs). As shown, optical subassembly 201 is a receiver OSA, while optical subassembly 202 is a transmitter OSA. Suitable OSAs for this purpose may be the LightABLE™ Optical Engine available from Reflex Photonics Inc., of Sunnyvale, Calif., or Avago Technologies, San Jose, Calif., a representative example 300 of which is shown in FIG. 3. OSA 300 includes a substrate 301, having connections 311 to which high-speed serial conductors 211, 221 may be connected for communication with high-speed serial interfaces of FPGA 101. Connections 311 may also be used to connect to standard I/O conductors 203 for communication with standard I/O ports of FPGA 101 for the exchange, e.g., of clock and control signals.

On OSA 300, connections 311 are coupled to a control circuit 321, which is in turn connected to optical portion 323. A connector, such as a standard MT optical fiber connector 302, is attached to optical portion 323. MT connection 302 may terminate up to 72 optical fiber connections, although the aforementioned LightABLE™ optical engine provides only 12 optical channels. In receiver OSA 201, optical portion 323 includes a photodiode detector 241, and a transimpedance amplifier/limiting amplifier/automatic gain control (TIA/LA/AGC) 251. In transmitter OSA 202, optical portion 323 includes an array of vertical-cavity surface-emitting lasers, or VCSELs 242, and suitable laser driver (LD) circuitry 252 for the lasers.

Although shown schematically in FIG. 2 to illustrate the electrical connections, system 200 may be formed as a single integrated circuit package (not shown), having conventional pins for the conventional I/Os of FPGA 101, and MT connectors 302 for the optical I/Os. Within that package, FPGA 101 and OSAs 201, 202 may be separately mounted on a suitable substrate and connected by wires, or OSAs 201, 202 may be surface-mounted on FPGA 101. Each of OSAs 201, 202 has an array of solder pads on its underside, which may be mated to a ball array or bump array of contacts, or land grid array (LGA) socket on FPGA 101.

Although system 200 provides a single package, the need to electrically interconnect FPGA 101 and OSAs 201, 202 consumes conventional I/O ports of FPGA 101, reducing the number of conventional I/O ports available for user applications. The present invention eliminates or greatly reduces the need to consume conventional I/O ports of FPGA 101.

Figure 4:
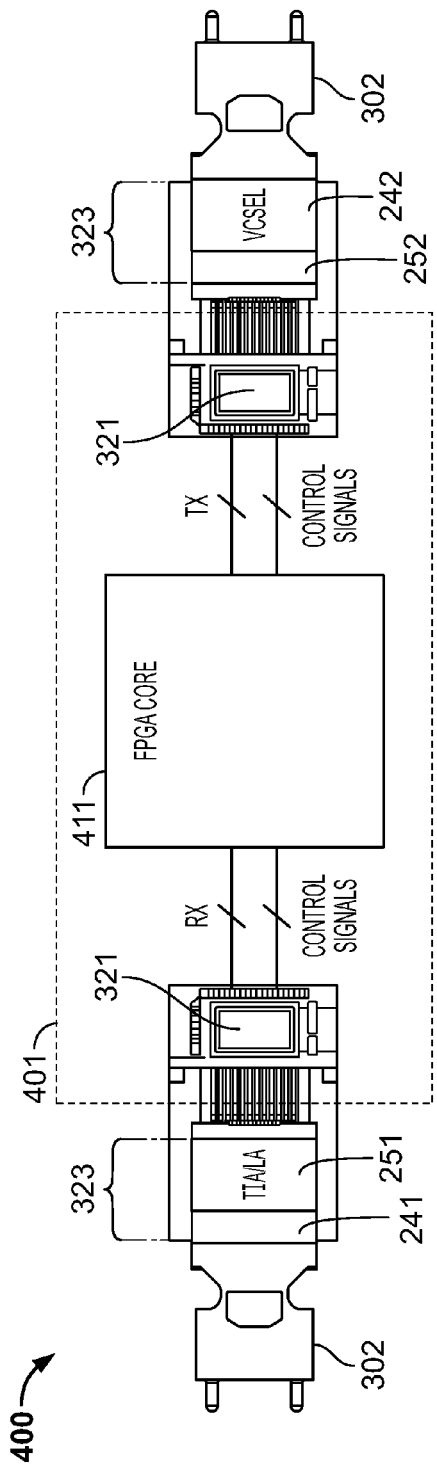
FIG. 4 is a schematic representation of an embodiment in accordance with the present invention for providing an optical-electronic interface for high-speed serial I/O channels on a programmable logic device.

In embodiment 400 shown in FIG. 4, FPGA 401 includes an FPGA core 411 similar to FPGA 101, formed on a die into which control circuits 321 of both OSA 201 and OSA 202 have been incorporated. Optical portions 323 and connectors 302 remain in the package outside the die. However, because control circuits 321 have been incorporated into FPGA 401, all connections between FPGA core 411 and control circuits 321 are internal to FPGA 401 and do not consume any of the conventional I/Os of FPGA 401.

Figure 5:
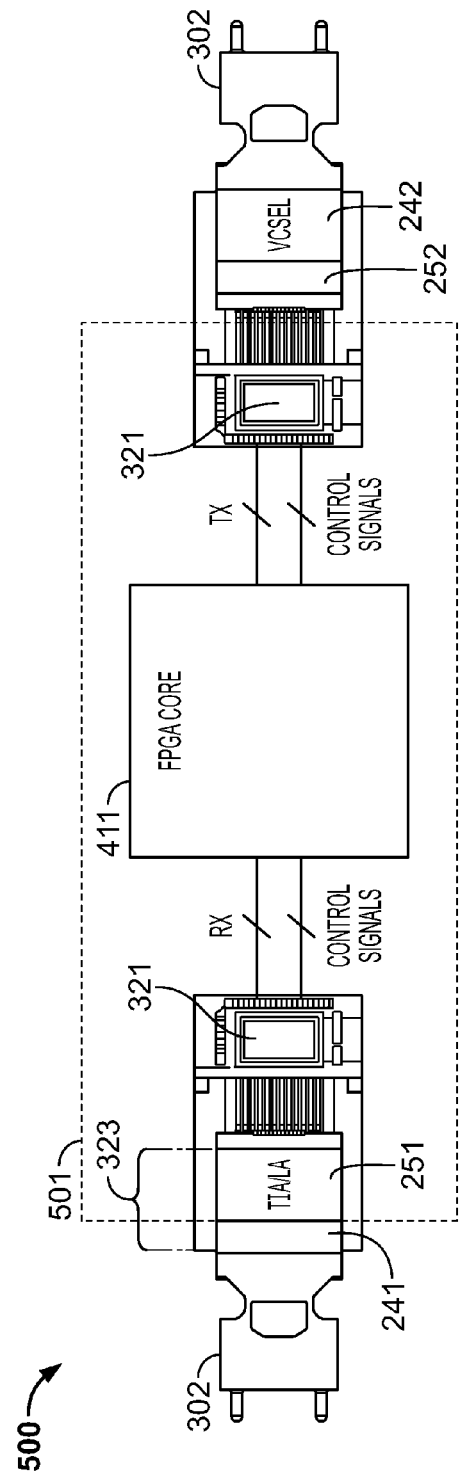
FIG. 5 is a schematic representation of an embodiment in accordance with the present invention for providing an optical-electronic interface for high-speed serial I/O channels on a programmable logic device.

In embodiment 500 shown in FIG. 5, FPGA 501 includes FPGA core 411, formed on a die into which not only control circuits 321, but also TIA/LA/AGC 251, have been incorporated. Optical portion 323 of transmitter OSA 202 remains completely outside the die, along with photodiode detector 241 and connectors 302.

Figure 6:
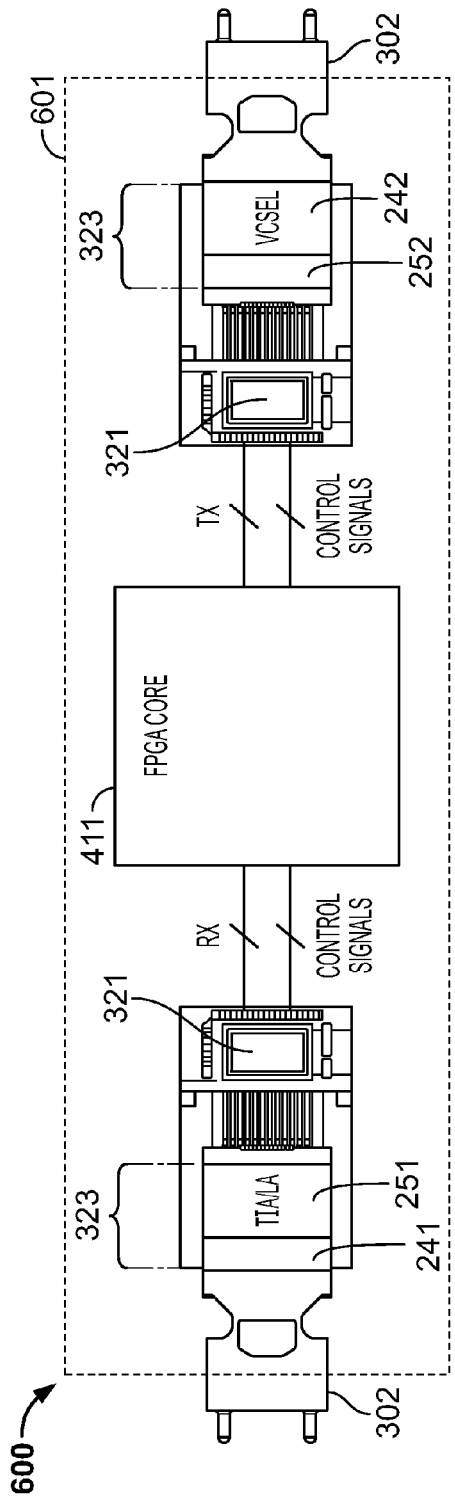
FIG. 6 is a schematic representation of an embodiment in accordance with the present invention for providing an optical-electronic interface for high-speed serial I/O channels on a programmable logic device.

In embodiment 600 shown in FIG. 6, FPGA 601 includes FPGA core 411, as well as all of receiver OSA 201 and transmitter OSA 202—including both control circuits 321 and all of both optical portions 323—except for connectors 302, formed in a single die. Connectors 302 may be surface-mounted to that die, or mounted separately in the package, and may be connected by optical fibers to respective optical portions 323. The optical components of optical portions 323, including photodiode detector 241 and laser array 242, may be formed in the die using suitable hybrid optical-electronic technology, such as silicon photonics.

Although each of embodiments 400, 500 and 600 is shown with a single pair of receiver OSA 201 and transmitter OSA 202, additional pairs of receiver OSA 201 and transmitter OSA 202 may be provided if the number of optical channels in a particular implementation of the device exceeds the number of channels that can be serviced buy a single pair of receiver OSA 201 and transmitter OSA 202.

As discussed above, while according to a variant of any of embodiments 400, 500, 600, all of the high-speed I/O channels may be optical, meaning that all of the high-speed I/O channels of FPGA core 411 are connected to optical interfaces, it may be desirable to provide a mix of electrical or electronic high-speed channels and optical high-speed channels. According to another variant of any of embodiments 400, 500, 600, only some of the high-speed I/O channels of FPGA core 411 are connected to optical interfaces, while the remaining channels are connected to conventional I/O pins for use as electrical or electronic channels. Different implementations of this variant may have different proportions of optical and electrical or electronic channels.

Figure 7:
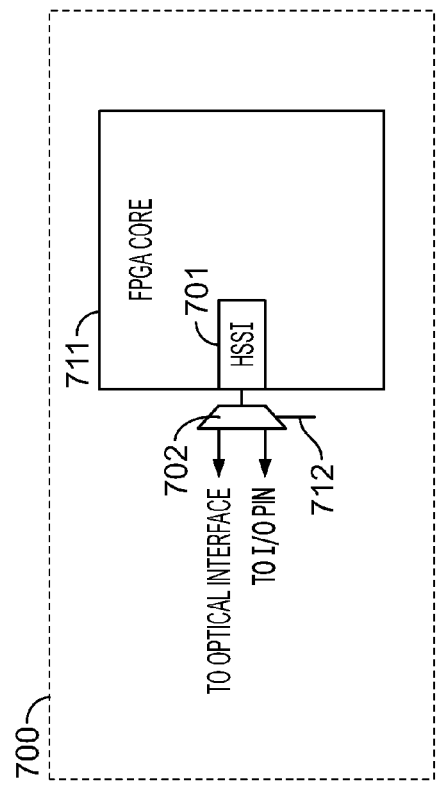
FIG. 7 is a schematic representation of a variant according to which any of the embodiments of FIGS. 4, 5 and 6 may be implemented.

According to another variant of any of embodiments 400, 500, 600, each high-speed I/O channel, or each member of a subset of the high-speed I/O channels, on FPGA core 411 is switchably connectable to either an optical interfaces or to a conventional I/O pin. As shown in FIG. 7, a high-speed serial interface (HSSI) 701 in FPGA core 711 of FPGA 700 is connected by a programmable interconnect component, such as a multiplexer 702, to either an optical interface or a conventional I/O pin. Control signal 712 may be a user signal provided on an I/O pin, or may be provided by logic elsewhere in FPGA 700.

Although the embodiments described above are based on incorporation of some or all of the components of the aforementioned optical engines into an FPGA (or other PLD) die, other interface technologies, including both electronic and optical components, may be used instead. Thus, a PLD die may incorporate any photodiode or other photodetector, any laser or laser array, any laser driver, any optical modulator/demodulator circuitry, optical wavelength division multiplexing (WDM)/demultiplexing circuitry and/or AGC circuitry. The optical components can be fabricated using hybrid silicon technologies such as silicon photonics, and can be interconnected optically, using, e.g., hybrid CMOS optical waveguide technology. And as already noted, PLDs according to embodiments of the invention may include a mix of standard electrical or electronic I/Os, high-speed electrical or electronic I/Os, and optical high-speed I/Os.

Figure 8:
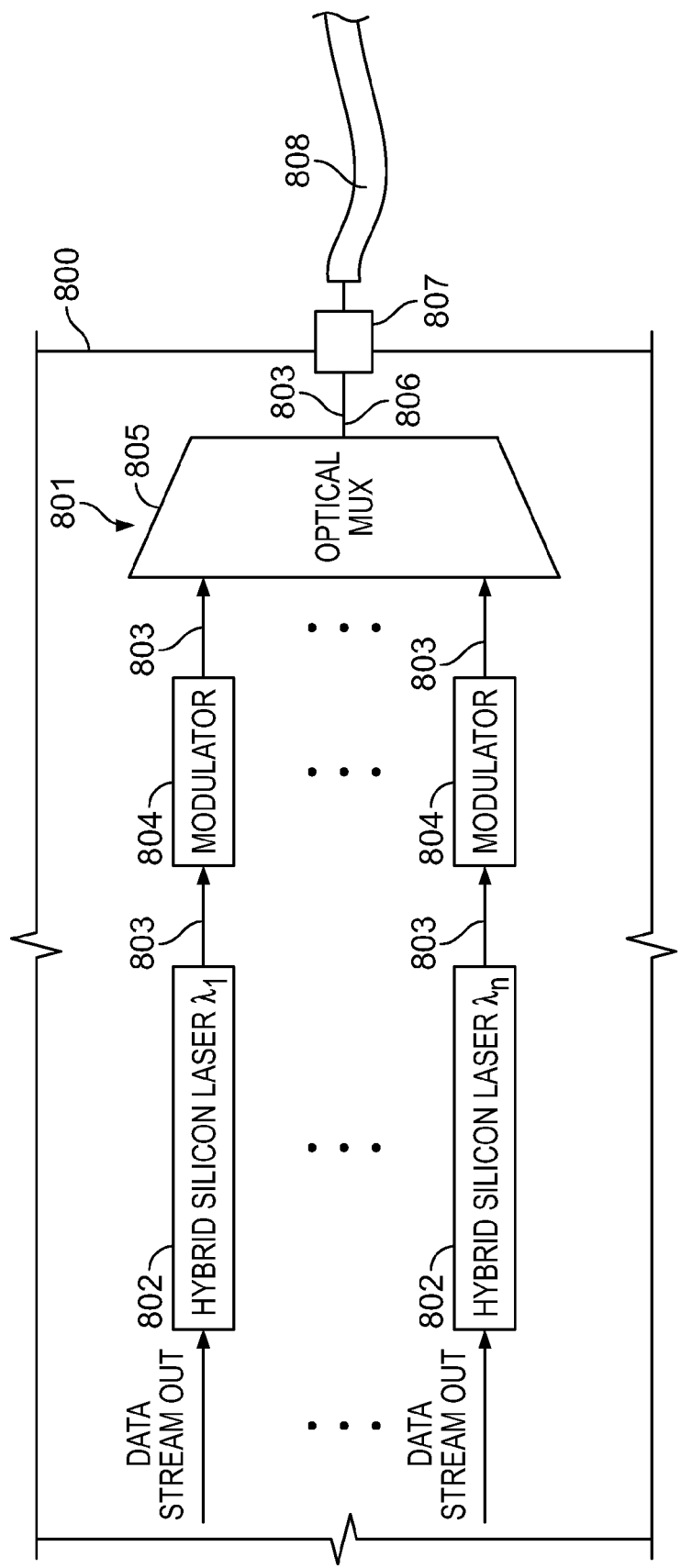
FIG. 8 is a schematic representation of an optical high-speed transmitter channel according to an embodiment of the invention.

As an example, a high-speed transmitter channel 801 seen in FIG. 8, incorporated into an FPGA 800, may include a plurality of hybrid silicon lasers 802, each driven by a 10 Gbps high-speed data stream output from elsewhere in FPGA 800. Transmitter channel 801 may also include and suitable laser driver (LD) circuitry (not shown) similar to laser driver (LD) circuitry 252, described above, connected to each or all of the lasers. Each laser 802 may have a different wavelength for reasons discussed below. The laser outputs are guided by optical waveguides 803 formed in the device silicon using, e.g., hybrid CMOS optical waveguide technology, to optical modulators 804. The modulated outputs are combined by optical multiplexer 805 into a single optical output 806 on which the individual optical data streams remain separated by their different wavelengths. Output 806 is connected by an optical waveguide to a suitable optical connector 807, such as an MT connector as described above, which connects to a single optical fiber 808 (e.g., a single mode fiber). Thus, multiple 10 Gbps high-speed data output channels are replaced, for I/O purposes, by a single optical I/O port operating at that multiple of 10 Gbps.

Figure 9:
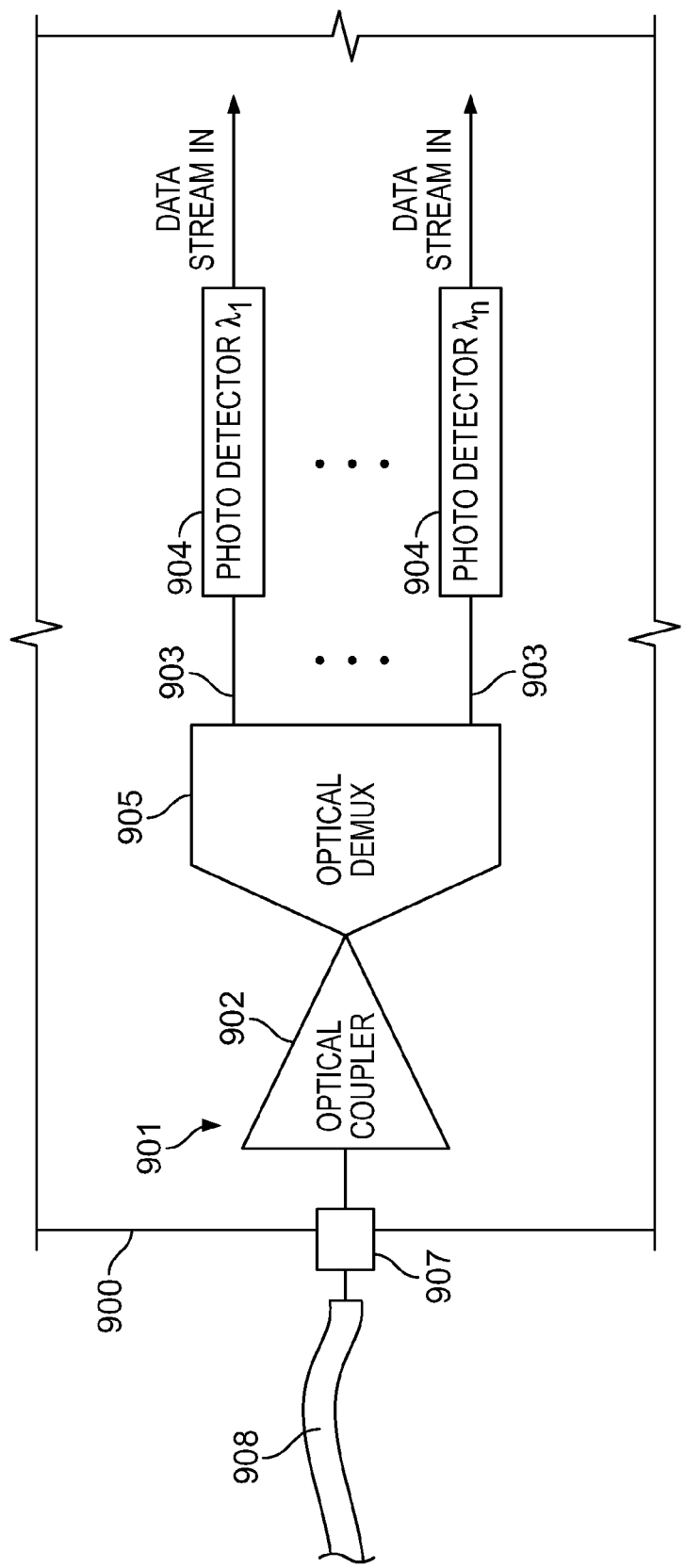
FIG. 9 is a schematic representation of an optical high-speed receiver channel according to an embodiment of the invention.

As another example, a high-speed receiver channel 901, as seen in FIG. 9, incorporated into an FPGA 900, may include a connector 907, such as an MT connector, to which a single optical fiber 908 is connected. Connector 907 is connected by an optical waveguide to a suitable optical coupler 902 and optical demultiplexer 905, which outputs a plurality of optical streams 902, conducted to photodetectors 904 by hybrid CMOS optical waveguides 903. Receiver channel 901 may also include a transimpedance amplifier/limiting amplifier/automatic gain control (TIA/LA/AGC) (not shown) similar to (TIA/LA/AGC) 251, described above, connected to each or all of photodetectors 904. The plurality of optical streams 902 output by demultiplexer 905 may have been kept separate on optical fiber 908 by having different wavelengths. The individual optical streams 902 are converted to high-speed electronic data streams 904, which may be input to respective 10 Gbps high-speed data channels (not shown) for further electronic processing. As above, multiple 10 Gbps high-speed data input channels are replaced, for I/O purposes, by a single optical I/O port operating at that multiple of 10 Gbps.

It will be appreciated that the recitation of data rates of 10 Gbps in the foregoing examples is merely exemplary. The individual channels could operate at any data rate, e.g. from 10 Gbps to 50 Gbps, or even faster. Moreover, although the embodiments described above, in each of FIGS. 1-9 may be described in relation to components incorporated in an FPGA or PLD, they may equally and/or identically be implemented in any integrated circuit or other device (examples include an ASSP, an ASIC, a full-custom chip, a dedicated chip). For example, PLD/FPGA circuitry 101, 401, 501, 601, 700, 800, and 900 may be any integrated circuit device circuitry and cores 411 and 711 may be core circuitry for any integrated circuit device.

What is claimed is:

1. Integrated circuit device circuitry comprising:
    core circuitry comprising a plurality of groups of high speed input/output channels, wherein each of the input/output channels of one of the plurality of groups is coupled to the output of a respective multiplexer, and wherein each of the multiplexers selects between an optical interface and an electrical interface based on a control signal from circuitry outside of the integrated circuit device circuitry;
    a receiver optical control circuitry coupled to the core circuitry; and
    a plurality of electrical input/output ports coupled to the core circuitry and integrated with the integrated circuit device circuitry, wherein none of the electrical input/output ports are consumed by the receiver optical control circuitry.

2. The integrated circuit device circuitry of claim 1, further comprising:
    a transimpedance amplifier coupled to the core circuitry.

3. The integrated circuit device circuitry of claim 2, further comprising:
    at least one photodiode detector, wherein the transimpedance amplifier is coupled between the at least one photodiode detector and the core circuitry.

4. The integrated circuit device circuitry of claim 3, further comprising an optical coupler, an optical demultiplexer, and an optical waveguide, each coupled to the at least one photodiode, wherein the optical demultiplexer outputs a plurality of optical streams that each have a different wavelength.

5. The integrated circuit device circuitry of claim 2, further comprising:
a transmitter optical control circuitry coupled to the core circuitry;
a laser array coupled to the core circuitry; and
laser driver circuitry coupled between the core circuitry and the laser array, wherein none of the electrical input/output ports are consumed by the transmitter optical control circuitry.

6. The integrated circuit device circuitry of claim 5, wherein the laser array comprises hybrid optical-electronic circuitry.

7. The integrated circuit device circuitry of claim 6, further comprising a modulator, an optical waveguide, and an optical multiplexer coupled to each laser in the laser array, wherein the laser array outputs optical streams that each have a different wavelength, and wherein the optical multiplexer combines the optical streams.

8. The integrated circuit device circuitry of claim 1, wherein each of the high speed input/output channels of another one of the plurality of groups is coupled to optical interfaces.

9. The integrated circuit device circuitry of claim 1, wherein some of the high speed input/output channels of another one of the plurality of groups are coupled to optical interfaces and other of the high speed input/output channels of the another one of the plurality of groups are coupled to electrical interfaces.

10. An optical-electronic package, the package comprising:
an integrated circuit device circuitry comprising:
core circuitry comprising a plurality of groups of high speed input/output channels, wherein each of the input/output channels of one of the plurality of groups is coupled to the output of a respective programmable interconnection circuitry, wherein each of the programmable interconnection circuitries selects between an optical interface and an electrical interface, and wherein each of the programmable interconnection circuitries is a multiplexer that receives a control signal from circuitry outside of the core circuitry;
a receiver optical control circuitry coupled to the core circuitry;
a transmitter optical control circuitry coupled to the core circuitry; and
a transimpedance amplifier coupled to the receiver optical control circuitry;
auxiliary receiver circuitry that is distinct from the integrated circuit device circuitry, comprising:
a first mechanical transfer connector coupled to the core circuitry, and
a photodiode detector coupled between the first mechanical transfer connector and the transimpedance amplifier; and
auxiliary transmitter circuitry that is distinct from the integrated circuit device circuitry, comprising:
a second mechanical transfer connector coupled to the core circuitry,
laser driver circuitry coupled to the transmitter optical control circuitry, and
a laser array coupled between the second mechanical transfer connector and the laser driver circuitry.

11. The optical-electronic package of claim 10, wherein each of the high speed input/output channels of another one of the plurality of groups is coupled to optical interfaces.

12. The optical-electronic package of claim 10, wherein some of the high speed input/output channels of another one of the plurality of groups are coupled to optical interfaces and other of the high speed input/output channels of the another one of the plurality of groups are coupled to electrical interfaces.

13. An optical-electronic package, the package comprising:
an integrated circuit device circuitry comprising:
core circuitry comprising a plurality of groups of high speed input/output channels, wherein each of the input/output channels of one of the plurality of groups is coupled to the output of a respective programmable interconnection circuitry, wherein each of the programmable interconnection circuitries selects between an optical interface and an electrical interface, and wherein each of the programmable interconnection circuitries is a multiplexer that receives a control signal from circuitry outside of the core circuitry;
a receiver optical control circuitry coupled to the core circuitry;
a transmitter optical control circuitry coupled to the core circuitry,
a transimpedance amplifier coupled to the receiver control circuitry;
a photodiode detector coupled between a first mechanical transfer connector and the transimpedance amplifier;
laser driver circuitry coupled to the transmitter optical control circuitry, and
a laser array coupled between a second mechanical transfer connector and the laser driver circuitry; and
auxiliary receiver circuitry that is distinct from the integrated circuit device circuitry, comprising:
the first mechanical transfer connector coupled to the core circuitry, and
auxiliary transmitter circuitry that is distinct from the integrated circuit device circuitry, comprising:
the second mechanical transfer connector coupled to the core circuitry.

14. The optical-electronic package of claim 13, wherein each of the high speed input/output channels of another one of the plurality of groups is coupled to optical interfaces.

15. The optical-electronic package of claim 13, wherein some of the high speed input/output channels of another one of the plurality of groups are coupled to optical interfaces and other of the high speed input/output channels of the another one of the plurality of groups are coupled to electrical interfaces.

* * * * *